April 26, 1938. A. LYSHOLM 2,115,338
GAS TURBINE SYSTEM
Filed Dec. 12, 1933 3 Sheets-Sheet 1
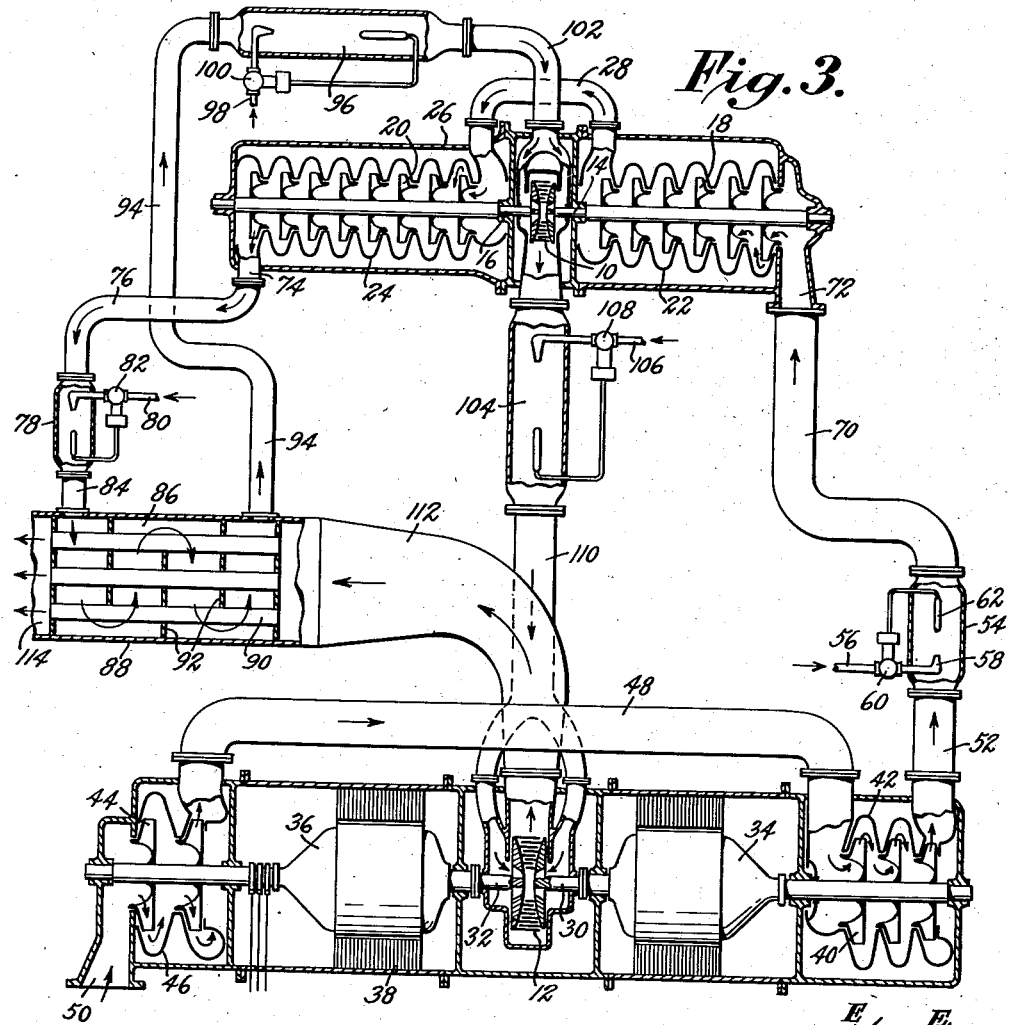
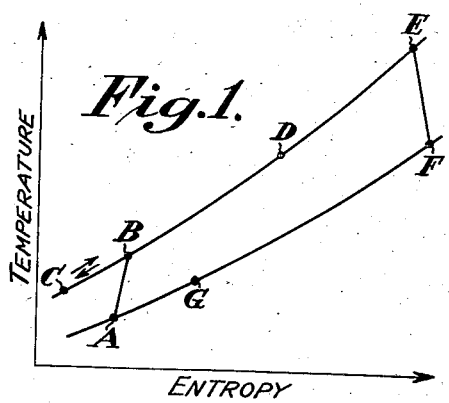
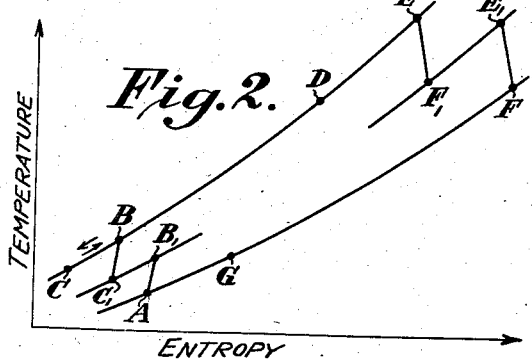
INVENTOR
Alf Lysholm
BY
ATTORNEY

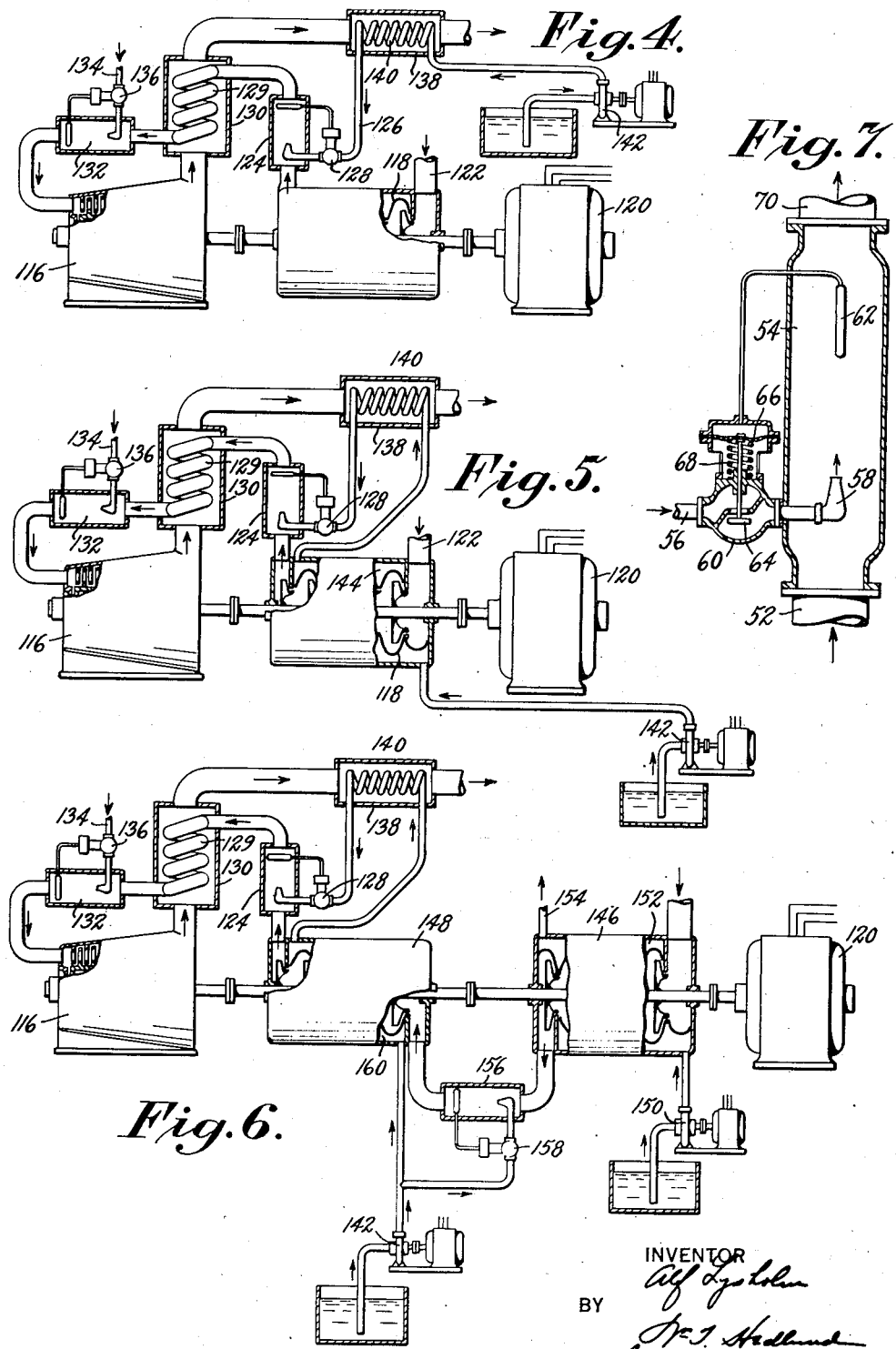

April 26, 1938. A. LYSHOLM 2,115,338
GAS TURBINE SYSTEM
Filed Dec. 12, 1933 3 Sheets-Sheet 3

INVENTOR
Alf Lysholm
BY
ATTORNEY

Patented Apr. 26, 1938

2,115,338

UNITED STATES PATENT OFFICE 2,115,338

GAS TURBINE SYSTEM

Alf Lysholm, Stockholm, Sweden, assignor to Aktiebolaget Milo, Stockholm, Sweden, a corporation of Sweden Application December 12, 1933, Serial No. 702,014
In Great Britain December 15, 1932

24 Claims. (Cl. 60—42)

The present invention relates to gas turbine systems of the continuous combustion type as distinguished from the intermittent combustion or explosion type and has particular reference to systems of this character in which motive fluid is produced by internal combustion of fuel with a gaseous combustion supporting medium compressed in one or more compressors which are in turn driven by one or more turbines, utilizing the products of such combustion as motive fluid.

The general object of the invention is to provide a system of the above character having relatively high efficiency while at the same time retaining relatively simple and inexpensive apparatus.

The invention is particularly advantageous for use in systems having power output capacity of what may be termed a medium value although it is also applicable to systems of relatively small and relatively large capacities.

The invention is further particularly advantageous in conjunction with gas turbine systems of the continuous combustion type in which the gaseous motive fluid is produced and admitted to the turbine or turbines of the system at a relatively moderate temperature and in which the energy of such motive fluid is converted into power in a turbine or turbines having high thermo-dynamic efficiency, whereby the motive fluid is finally exhausted from the turbine or turbines of the system at a relatively low temperature.

In general, it may be said that I attain the principal object of the invention, as well as the other objects thereof which will hereinafter appear, by cooling the compressed gaseous combustion supporting medium, preferably after final compression, by the injection of a cooling fluid adapted to reduce the temperature of the compressed medium to a relatively low value and then heating the cooled compressed medium by passing it in heat exchange relation with motive fluid exhausted from one or more turbines of the system, prior to producing motive fluid from the compressed medium by the combustion of fuel therewith. By this process I am enabled to secure relatively high thermal efficiency of the system with relatively simple compressing equipment, since this method is particularly adapted for use with adiabatic compression of the gaseous medium, which type of compression permits the use of very simple compressor apparatus.

The invention is applicable to many different specific arrangements of gas turbine systems, and for purposes of illustration I have shown in the accompanying drawings several embodiments of apparatus for carrying the invention into effect, together with certain diagrams illustrating the thermal characteristics of the cycle in accordance with the invention as applied to different system arrangements.

In the systems illustrated the combustion supporting medium employed is air, in which liquid fuel such as fuel oil is burned to produce motive fluid, and water is employed as the cooling medium. For convenience I will refer, but without limitation, to the combustion supporting medium and the cooling medium as air and water respectively, it being understood that other media having equivalent functions may be employed instead. Also the fuel may be a gaseous medium such as blast furnace gas, suitably compressed.

In the drawings:

Fig. 1 is a gas-temperature entropy diagram illustrative of the cycle in a relatively simple system adapted to operate at comparatively low pressure;

Fig. 2 is a similar diagram illustrative of the cycle in a system employing a plurality of compressors and turbines;

Fig. 3 is a more or less diagrammatic illustration of a gas turbine plant embodying the invention and adapted for operation at relatively constant load;

Fig. 4 is a more or less diagrammatic illustration of a system showing another arrangement embodying the invention;

Fig. 5 is a view similar to Fig. 4 showing a third arrangement embodying the invention;

Fig. 6 is a view similar to Fig. 4 showing still another arrangement embodying the invention;

Fig. 7 is a more or less diagrammatic view on an enlarged scale of control apparatus of the type shown in Figs. 3 to 6.

Figure 8:
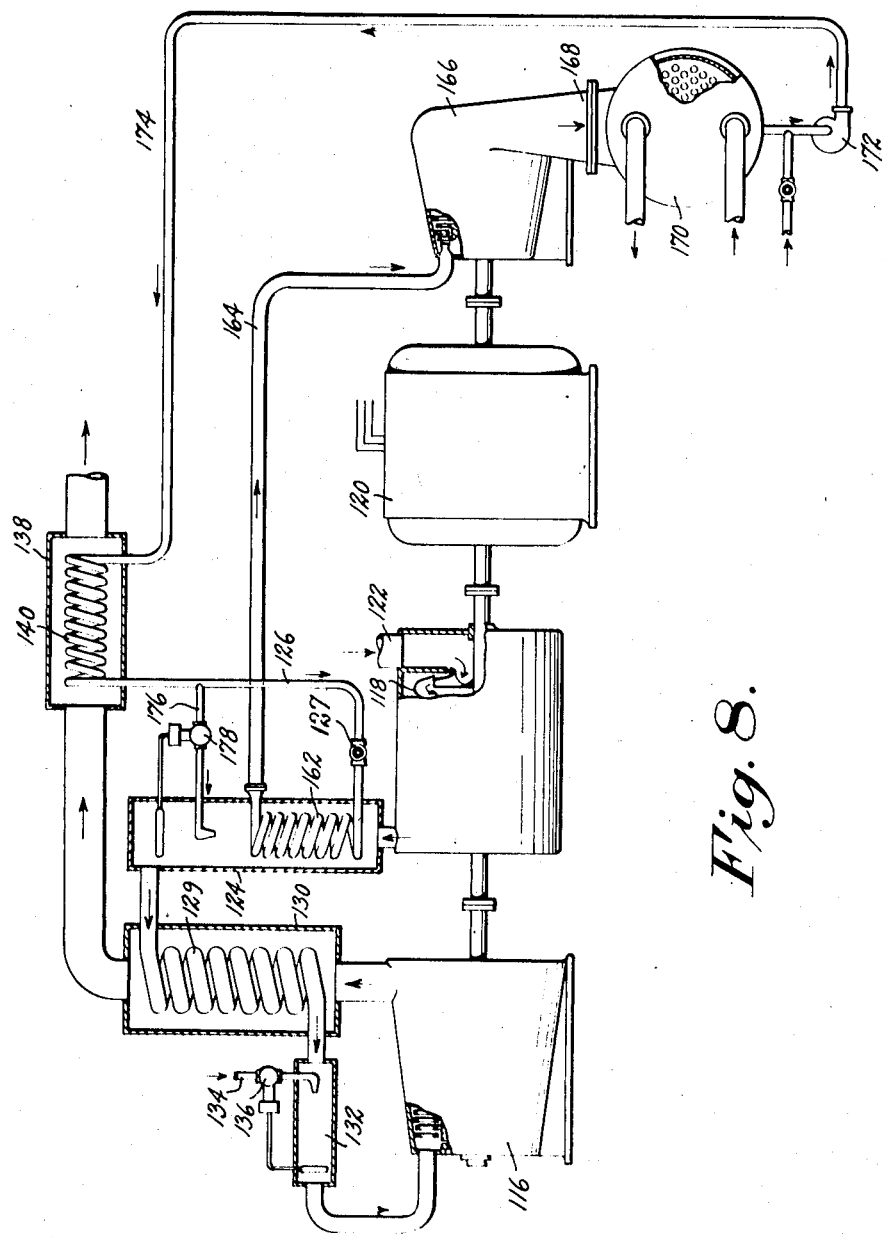
Fig. 8 is a view similar to Fig. 4 showing a further arrangement embodying the invention.

Referring to Fig. 1, the temperature entropy diagram of this figure illustrates the thermal cycle embodying the invention as applied to a gas turbine system comprising a single adiabatic compressor and a single gas turbine. Point A of the diagram indicates the temperature and pressure of the air at the inlet of the compressor. In the example shown, this pressure may be atmospheric and the temperature normal room temperature, for example, 15° C. The air is compressed adiabatically, as indicated by the line A—B, the point B indicating the temperature and pressure of the air as delivered from the compressor. This pressure may be 4 kg./sq. cm., at which pressure the temperature will have been raised by compression to approximately 205° C. The compressed air is then cooled at substantially constant pressure, preferably by injection of water, to a temperature which may, for example, be 80° C., the cooling being represented by the line B—C. Cooling is effected by vaporization of the injected water, which may be in vapor phase at the elevated pressure of the air-steam mixture because of the partial pressure effect obtained. The mixture of compressed and cooled air and vaporized water is then passed in heat exchange relation with motive fluid exhausted from the turbine of the system and its temperature is raised at substantially constant pressure from 80° C. to, for example, 425° C. This heating of the compressed air is indicated by the line C—D. The compressed air is then heated further by internal combustion at substantially constant pressure to produce motive fluid at a temperature of say 700° C., this heating being represented by the line D—E. The motive fluid is then expanded in the turbine to substantially atmospheric pressure, the temperature dropping from 700° C. to say 450° C., at which temperature and pressure the motive fluid is exhausted from the turbine system. This expansion in the turbine is indicated by the line E—F. The motive fluid exhausted from the turbine is then passed in heat exchange relation with the compressed air, which has been cooled to the temperature indicated at point C, and due to the relatively low temperature of the air, gives up a substantial proportion of its heat, being cooled to say 110° C. This cooling by heat exchange to the cooled, compressed air is represented by the line F—G, and takes place at substantially constant pressure.

From the above description it will be evident that relatively high heat recovery from the motive fluid exhausted from the turbine system may readily be obtained without resorting to the use of complicated or expensive apparatus. By compressing adiabatically, a compressor of simple type may be employed. By injecting water into the finally compressed air the temperature of the compressed air is materially reduced, so that favorable heat exchange conditions with respect to the exhaust motive fluid are obtained, but the heat generated by compression of the air is not lost, since this heat is represented by the vaporized water constituent of the motive fluid.

If we assume 25° C. to be the minimum practical temperature difference between the heating and heated fluids in the heat exchange apparatus, it will be evident that by employing the above described method a very much higher heat recovery can be obtained from the exhaust motive fluid than would otherwise be the case. With the motive fluid expanded to an exhaust temperature of 450° C. the maximum temperature to which the compressed air can be raised in the heat exchange apparatus is approximately 425° C., as indicated at point D on the diagram, and if cooling of the compressed air prior to the heat exchange were not employed the maximum increase in temperature of the compressed air due to such heat exchange would be approximately 220° C., as represented by the line B—D, and the temperature of the motive fluid leaving the heat exchange apparatus would be approximately 255° C. By cooling the compressed air to approximately 80° C. before effecting the heat exchange, it is possible to raise the temperature of the air in the heat exchange apparatus approximately 345° C. and to lower the temperature of the motive fluid as exhausted from the turbine by approximately 340° C. Thus, it will be evident that by cooling the compressed air prior to heating with exhaust motive fluid, approximately 1.7 times as much heat can be recovered from the exhaust motive fluid and usefully returned to the system as would be possible without such cooling of the compressed air, and in accordance with the present invention this comparatively large heat recovery may be obtained with comparatively simple and inexpensive apparatus. When water is injected for cooling purposes, some thermal loss is entailed because of the latent heat of vaporization of the injected water which is finally exhausted at point G in the form of steam, but this loss is more than counterbalanced by the additional recovery of heat from the exhaust motive fluid which is made possible by the cooling of the compressed air due to injection of water.

In Fig. 2, a diagram similar to Fig. 1 has been shown, illustrating a cycle for a plant employing a plurality of turbines and compressors such, for example, as the plant illustrated in Fig. 3. In accordance with this cycle air at atmospheric pressure and normal temperature of 15° C. is compressed as indicated along the line A—$B_1$, to a pressure of say 2.4 kg./sq. cm. and temperature of 115° C. in a low pressure compressor. It is then advantageously cooled at substantially constant pressure as indicated by line $B_1$—$C_1$ to a temperature of 65° C., at which pressure and temperature it enters the high pressure compressor for compression as indicated by the line $C_1$—B to a pressure of 5 kg./sq. cm. and temperature of 160° C. The finally compressed air is again cooled at substantially constant pressure as indicated by the line B—C to a temperature of 95° C. and after final cooling is heated at substantially constant pressure by heat exchange with the exhaust motive fluid to a temperature of approximately 425° C., as indicated by the line C—D. Further heating by combustion is then effected at substantially constant pressure by combustion to produce motive fluid at a temperature of approximately 725° C. at the point E. The motive fluid is then expanded in the high pressure turbine along the line E—$F_1$ to a pressure of approximately 2.6 kg./sq. cm. and a temperature of approximately 470° C. The partially expanded and cooled motive fluid is then advantageously reheated by further combustion at substantially constant pressure from a temperature $F_1$ of 470 C. to a temperature represented by the point $E_1$, which is advantageously substantially the same temperature as the initial temperature E. The reheated motive fluid is then expanded in the low pressure turbine to atmospheric pressure, the temperature dropping to approximately 455° C., and the finally expanded motive fluid is then passed in heat exchange relation with the finally compressed air, giving up heat thereto at substantially constant pressure and being finally discharged at a temperature of approximately 125° C.

It will be evident from the foregoing that the cycle described in conjunction with Fig. 2 operates to obtain an increased heat recovery from the exhaust motive fluid and consequently increased thermal efficiency, in substantially the same way that such increased recovery is obtained in the cycle previously described in conjunction with Fig. 1. Reheating of motive fluid between turbines is not essential to the invention.

and it will be evident also that intercooling between compressors is not essential, although this is desirable from a practical standpoint. If it is essential in a particular system that the compressor apparatus be of minimum size, the interstage cooling along line $B_1$—$C_1$ may be effected by the use of cooling water or the like out of contact with the air, but in many instances cooling by injection of water is to be preferred, even though such injection increases the volume of fluid to be compressed in the high pressure compressor.

Referring to Fig. 3, the system shown in this figure is adapted to operate in accordance with the cycle illustrated in Fig. 2. The system comprises a high pressure turbine indicated at 10, and a low pressure turbine indicated generally at 12. The turbines shown are of the type known as double rotation radial flow, but other types of turbines may be employed. Turbine 10 comprises two oppositely rotating shafts 14 and 16, having the usual turbine rotors associated therewith, and on the extensions of the turbine shafts are mounted respectively the rotors 18 and 20 of the two sections 22 and 24 of a rotary or centrifugal compressor indicated generally at 26. Other forms of compressor may be employed. The sections of the compressor are serially connected by means of a suitable connection 28. The oppositely rotating shafts 30 and 32 of turbine 12 drive the armatures 34 and 36 of an electric generator, indicated generally at 38, which is adapted to produce net useful power in the form of electricity. An extension of the shaft of armature 34 carries the rotor 40 of a compressor section 42, and the extended shaft of armature 36 carries the rotor 44 of a compressor section 46. Sections 42 and 46 are serially connected by a conduit 48 and these sections together constitute the low pressure compressor of the system. Air is drawn into the low pressure compressor section 46 through the inlet 50 and is discharged from the low pressure compressor section 42 through conduit 52 to the interstage cooler 54. Water is supplied to this cooler through pipe 56 and nozzle 58. It is of course highly desirable that the amount of water supplied to the cooler be limited to an extent such that all of the water admitted is vaporized. This may be accomplished in any suitable way. For purposes of illustration I have shown a control valve indicated generally at 60 for controlling admission of water in accordance with the temperature of the air as cooled by the water injection. To this end a thermostat 62 is advantageously placed in the cooler on the discharge side of the nozzle 58.

In Fig. 7 I have shown a more or less diagrammatic view on a larger scale of a suitable form of control valve, in which the valve member 64 is opened by movement of the diaphragm 66 in response to the expansion of motive fluid in the thermostat 62, and which closes under the action of spring 68 as the temperature in the cooler 54 falls. Cooler 54 is connected by conduit 70 to the inlet 72 of the high pressure compressor section 22, and the finally compressed air, together with the vaporized water from cooler 54, is delivered from the outlet 74 of the high pressure compressor section 24 through the conduit 76 to a second cooler 78, to which water is injected from the supply pipe 80 under the control of a valve 82, which may be similar in construction to valve 60. The outlet of cooler 78 is connected by means of connection 84 to a heat exchanger 86 of the surface type hereinafter referred to as a regenerator. This regenerator may be of any suitable form of surface type heat exchange apparatus, the one illustrated comprising a shell 88 having a plurality of tubes 90 through which the motive fluid exhausted from turbine 12 is passed. The space around tubes 90 is preferably baffled as by baffles 92 and the cooled and compressed air from the cooler 78 flows through this space in generally countercurrent direction with respect to the direction of flow of the exhaust motive fluid, as indicated by the arrows in the figure, to the conduit 94 which leads to the inlet of a combustion chamber 96. Fuel is admitted to chamber 96 through pipe 98 under the control of suitable valve means indicated at 100. The amount of fuel admitted to the combustion chamber may be regulated in any suitable manner to obtain the desired final temperature of the motive fluid which is discharged through conduit 102 to turbine 10. Advantageously the fuel control is made automatically responsive to temperature of the motive fluid, as indicated in the drawings. As previously pointed out, the invention is particularly applicable in gas turbine systems in which the gas temperature, at the place of initial expansion, is of relatively moderate value and in which the gas is expanded in the turbine or turbines of the system to a relatively low temperature. Therefore, in a system such as the one illustrated, I prefer to regulate the fuel supply so that the temperature of the resulting gaseous motive fluid as admitted to the first turbine or turbines of the system is within a temperature range of which the lower limit is approximately 800° C. absolute and the upper limit is of the order of 1000° C. absolute.

The motive fluid exhausted from turbine 10 is reheated in a second combustion chamber 104 to which fuel is admitted through pipe 106 under the control of valve 108, and the reheated motive fluid is conducted through conduit 110 to the turbine 12. From turbine 12 the motive fluid is exhausted through conduit 112 to the regenerator 86, from which is passes through the discharge pipe 114. In the form of reheating apparatus shown, combustion of additional fuel in the reheater 104 is supported by excess air in the motive fluid as discharged from the combustion chamber 96.

In the arrangement shown in Fig. 3 the turbines are shown as being connected in series with respect to flow of motive fluid therethrough, but it will be evident that insofar as the present invention is concerned, other arrangements of the turbines with respect to flow of motive fluid may be employed.

The operation of the system and the manner in which it provides and utilizes motive fluid in accordance with the cycle illustrated in Fig. 2, will be evident from the foregoing description of the apparatus, and it is not believed that the operation need be described in further detail.

In Fig. 4 I have shown another application of the invention illustrating apparatus for obtaining still further recovery of heat from the exhaust motive fluid. For purposes of illustration this modification is shown in conjunction with a simple system comprising a single turbine 116 driving a compressor 118 and a power output generator 120. Air enters the compressor at the inlet 122 and is discharged to a cooler 124 to which water is supplied through pipe 126 under the control of valve 128. The cooled compressed air passes through the coil 129 of the regenerator 130 to the combustion chamber 132. Fuel is admitted to combustion chamber 132 through pipe 134 under the control of valve 136 and the motive fluid produced in the combustion chamber, after being expanded in turbine 116, is exhausted through the regenerator 130 to a surface heat exchanger 138 in which is located a coil 140 through which the water supplied to pipe 126 passes from the source of supply, such as pump 142. In this arrangement the exhaust motive fluid after having passed through the regenerator 130 is cooled to a still lower temperature by the water passing through coil 140 and the heat thus recovered is usefully employed in the system. It will be evident that if desired the exhaust motive fluid may be utilized to generate steam, which may be admitted to the cooler through the pipe 126 and which will serve to cool the compressed air as delivered by the compressor 118, since the temperature of the finally compressed air is substantially higher than the vaporization temperature of water at the pressure of the air as delivered from the compressor.

In Fig. 5, an arrangement is shown which is in general the same as that shown in Fig. 4. In the present arrangement, however, surface cooling is employed to cool the air during compression. To this end, the water for injection supplied by the pump 142 is caused to flow around the inner shell of the compressor 118 through the space 144 before passing to coil 140 in the heat exchanger 138. In other respects the arrangement of the system is the same as that in Fig. 4.

In the arrangement illustrated in Fig. 6, a single turbine 116 is employed, but the air is compressed in a low pressure compressor 146 and a high pressure compressor 148. In this arrangement the air is cooled while being compressed in the low pressure compressor by passing water from the pump 150 through the space 152 around the inner shell of the compressor, the cooling water being discharged through pipe 154 to any suitable place of utilization for heated water. The air discharged from the low pressure compressor is cooled by an interstage cooler 156 to which water is supplied from pump 142 under the control of valve 158. The air is further cooled during compression in the compressor 148 by water from pump 142 passing through the space 160 and the water from space 160 is delivered to the preheating coil 140 in the heat exchanger 138. The remaining part of the apparatus is like that described in conjunction with Figs. 4 and 5.

In Fig. 8, an arrangement is shown which is in general the same as that shown in Fig. 4. In the present arrangement, however, surface cooling is employed to cool the air after compression. To this end, the cooling water is passed through a coil 162 located in the cooler 124. The steam produced by the vaporization of the water in the coil 162 passes through pipe 164 to a steam turbine 166 which drives the electric generator 120.

In order to insure the vaporization of all of the water supplied to coil 162 so that no appreciable amount of water, which would damage turbine 166, is carried over to this turbine, any suitable control may be employed in conduit 126 such as a hand valve 127 indicated in the drawings or a suitable thermostatically controlled valve of the type shown in Fig. 7. After being expanded in turbine 166, the steam flows through exhaust pipe 168 into the condenser 170. Hence, the water of condensation is conducted by means of pump 172 through pipe 174 into the coils 140 of the regenerator 138 where it is preheated with exhaust motive fluid of the gas turbine 116. Then, the preheated water passes again through the cooler 124. In this manner, the heat absorbed by the cooling water is used for producing additional power in the steam turbine. In this arrangement, I have also shown a branch pipe 176 connected with the cooling water pipe 126 by means of which water may be injected into the compressed air. The injection of water may be controlled by means of a valve 178, which may be operated in the same manner as described in conjunction with Fig. 3. Additional cooling by injection of water may take place if the temperature of the compressed air is not sufficiently decreased by surface cooling only.

The arrangement for further recovery of heat shown in Figs. 4 to 6, and 8, and the arrangement for cooling the air during compression as well as after final compression are of advantage in certain types of systems where the nature of the operation is such that the increase in thermal efficiency obtainable by such arrangements justifies the capital cost of the apparatus necessary to effect such further heat recovery. In all instances, however, in accordance with the present invention, no substantial compression and heating of the air due to compression is effected after the air is last cooled.

From the foregoing description it will be evident that the invention is applicable to a wide variety of arrangements of gas turbine systems and it is to be understood as embracing all such systems as may fall within the terms of the appended claims when construed as broadly as is consistent with the state of the prior art.

What I claim is:

1. The improved method of operation of a gas turbine system of the continuous combustion type in which air is compressed and utilized for the combustion of fuel to provide a motive fluid for operating turbine means comprising part of the system, which comprises compressing air with increase in temperature, cooling the finally compressed air by the injection of water therewith and vaporizing the injected water due to the temperature of the compressed air, heating the mixture of cooled compressed air and vaporized water by passing it in heat exchange relation with exhaust motive fluid from said turbine means and thereafter further heating the mixture by combustion of fuel therewith to produce motive fluid and expanding said motive fluid in said turbine means.

2. The improved method of operation of a gas turbine system of the continuous combustion type in which air is compressed and utilized for the combustion of fuel to provide a motive fluid for operating turbine means comprising part of the system, which comprises compressing air adiabatically, cooling the finally compressed air by the injection of water therewith and vaporizing the injected water due to the temperature of the compressed air, heating the mixture of cooled compressed air and vaporized water by passing the mixture in heat exchange relation with exhaust motive fluid from said turbine means, and thereafter further heating the mixture by combustion of fuel therewith to produce motive fluid and expanding said motive fluid in said turbine means.

3. The improved method of operation of a gas turbine system of the continuous combustion type in which air is compressed and utilized for the combustion of fuel to provide motive fluid for operating turbine means comprising part of the system, which comprises compressing the air with increase in temperature, cooling the finally compressed air by injection of water therewith, limiting the amount of water injected to insure vaporization of all of the water due to the heat of the air, heating the mixture of cooled compressed air and the vaporized water by passing it in heat exchange relation with motive fluid exhausted from said turbine means, and thereafter further heating said mixture by combustion of fuel therewith to produce motive fluid, and expanding said motive fluid in said turbine means.

4. The improved method of operation of a gas turbine system of the continuous combustion type in which air is compressed and utilized for the combustion of fuel to provide motive fluid for operating turbine means comprising part of the system, which comprises compressing the air in separate low pressure and high pressure stages of compression, cooling the air with water between stages of compression, cooling the finally compressed air by the injection of water therewith, heating the mixture of cooled compressed air and vapor of the injected water by passing the mixture in heat exchange relation with motive fluid exhausted from said turbine means, and thereafter further heating said mixture by combustion of fuel therewith to produce motive fluid and expanding said motive fluid in said turbine means.

5. The improved method of operation of a gas turbine system of the continuous combustion type in which air is compressed and utilized for the combustion of fuel to provide motive fluid for operating turbine means comprising part of the system, which comprises compressing the air with increase of temperature, cooling the finally compressed air with water injected therewith, heating the mixture of cooled compressed air and vaporized water with motive fluid exhausted from said turbine means, thereafter further heating said mixture by combustion of fuel therewith to produce motive fluid, maintaining a relatively moderate temperature of the motive fluid at the place or places of initial expansion thereof in the system, and expanding said motive fluid in said turbine means to substantially atmospheric pressure.

6. The improved method of operation of a gas turbine system of the continuous combustion type in which air is compressed and utilized for the combustion of fuel to provide a motive fluid for operating turbine means comprising part of the system, which comprises compressing the air with increase of temperature, cooling the finally compressed air with water injected therewith, heating the mixture of cooled compressed air and vaporized water with motive fluid exhausted from said turbine means, thereafter further heating said mixture by combustion of fuel therewith to produce motive fluid, maintaining the temperature of the motive fluid at the place or places of the initial expansion thereof in the system within a range the lower limit of which is approximately 800° C. absolute and the upper limit of which is of the order of 1000° C. absolute, and expanding said motive fluid in said turbine means to substantially atmospheric pressure.

7. The improved method of operation of a gas turbine system of the continuous combustion type in which air is compressed and utilized for the combustion of fuel to provide a motive fluid for operating turbine means comprising part of the system, which comprises compressing the air with increase of temperature to a value sufficiently high to vaporize water, cooling the finally compressed air by injection of water therewith, regulating the injection of water to reduce the temperature of the air and vaporized water mixture to a relatively low value, heating the mixture by combustion of fuel therewith to produce motive fluid, maintaining the temperature of the motive fluid at a relatively moderate temperature level at the place or places of initial expansion thereof in the system, expanding the motive fluid in said turbine means to substantially atmospheric pressure whereby to obtain relatively low temperature of the exhaust motive fluid, and recovering a substantial portion of the heat of the exhaust motive fluid at low temperature level by passing said mixture of compressed air and vaporized water in heat exchange relation and at its relatively low temperature with the exhaust motive fluid before heating the air by combustion of fuel therewith.

8. In a gas turbine system of the continuous combustion type in which air is compressed and utilized for the combustion of fuel to provide a motive fluid for operating turbine means comprising a part of the system, the improved method of operation which comprises compressing air in a plurality of stages, cooling the air during compression with water out of contact with the air, cooling the finally compressed air by injection of the cooling water thereinto, heating the compressed and cooled air with motive fluid which has been expanded in the system, and thereafter heating the compressed air by internal combustion of fuel therewith to produce motive fluid and expanding said motive fluid in said tubrine means.

9. In a gas turbine system of the continuous combustion type in which air is compressed and utilized for the combustion of fuel to provide a motive fluid for operating turbine means comprising a part of the system, the improved method of operation which comprises compressing air in a plurality of stages, cooling the air during compression with water out of contact with the air, heating the cooling water with motive fluid exhausted from the system, injecting the heated cooling water into the compressed air to cool the compressed air, heating the compressed and cooled air with motive fluid exhausted from the system at a higher temperature level than that at which said cooling water is heated, and thereafter heating the compressed air by internal combustion of fuel therewith to produce motive fluid and expanding said motive fluid in said turbine means.

10. In a gas turbine system of the continuous combustion type in which air is compressed and utilized for the combustion of fuel to provide a motive fluid for operating turbine means comprising a part of the system, the improved method of operation which consists in compressing air with increase in temperature to a value sufficiently high to vaporize water, heating water by passing it in heat exchange relation and out of contact with the air during compression, cooling the compressed air by injection of the heated water therewith, heating the compressed air with motive fluid expanded in the system, and thereafter heating said air by internal combustion of fuel therewith to produce motive fluid and expanding said motive fluid in said turbine means.

11. In a gas turbine system of the continuous combustion type in which air is compressed and utilized for the combustion of fuel to provide a motive fluid for operating turbine means comprising a part of the system, the improved method of operation which consists in compressing air with increase in temperature to a value sufficiently high to vaporize water, heating water by passing it in heat exchange relation and out of contact with exhaust motive fluid, cooling the compressed air by injection of the heated water therewith, regulating the injection of water to insure vaporization of all of the water injected into the compressed air, heating the compressed air with motive fluid expanded in the system and at a higher temperature level than that at which said water is heated by exhaust motive fluid, and thereafter heating said air by internal combustion of fuel therewith to produce motive fluid and expanding said motive fluid in said turbine means.

12. A gas turbine system of the continuous combustion type comprising turbine means, compressor means and power output means driven by said turbine means, said compressor means compressing air to form a constituent of motive fluid to be expanded in said turbine means, a cooler, means for conducting air after final compression in said compressor means to said cooler, means for injecting water into said air in said cooler whereby to cool the compressed air by vaporizing said water, a regenerator, means for conducting the mixture of compressed air and vaporized water from the cooler to the regenerator, means for conducting expanded motive fluid from said turbine means to said regenerator, means providing a combustion chamber, means for conducting said mixture from the regenerator to the combustion chamber, means for supplying fuel to the combustion chamber, and means for conducting motive fluid from the combustion chamber to said turbine means for expansion therein.

13. A gas turbine system of the continuous combustion type comprising turbine means, compressor means, and power output means driven by said turbine means, said compressor means compressing air to form a constituent of motive fluid to be expanded in said turbine means, a cooler, means for conducting air after final compression in said compressor means to said cooler, means for injecting water into said air in said cooler whereby to cool the compressed air by vaporizing said water, means for limiting the amount of water supplied to said cooler to insure vaporization of all of the water supplied thereto, a regenerator, means for conducting the mixture of compressed air and vaporized water from the cooler to the regenerator, means for conducting expanded motive fluid from said turbine means to said regenerator, means providing a combustion chamber, means for conducting said mixture from the regenerator to the combustion chamber, means for supplying fuel to the combustion chamber, and means for conducting motive fluid from the combustion chamber to said turbine means for expansion therein.

14. A gas turbine system of the continuous combustion type comprising turbine means, compressor means and power output means driven by said turbine means, said compressor means beng adapted to compress air adiabatically, a cooler, means for conducting compressed air at final pressure from said compressor means to said cooler, means for injecting water into the air in said cooler whereby to cool the compressed air due to vaporization of the water, a regenerator, means for conducting the mixture of compressed and cooled air and vaporized water to said regenerator, means for conducting motive fluid exhausted from said turbine means to said regenerator, means providing a combustion chamber, means for conducting said mixture from said regenerator to said combustion chamber, means for supplying fuel to said combustion chamber, and means for conducting the motive fluid from said combustion chamber to said turbine means.

15. A gas turbine system of the continuous combustion type comprising turbine means, compressor means and power output means driven by said turbine means, said compressor means compressing air to form a constituent for motive fluid to be utilized in said turbine means, a cooler, means for conducting air after final compression in said compressor means to said cooler, means for injecting water into said air in said cooler whereby to cool the compressed air by vaporizing said water, a regenerator, means for conducting the mixture of compressed air and vaporized water from the cooler to the regenerator, means for conducting exhaust motive fluid to said regenerator, means providing a combustion chamber, means for conducting said mixture from the regenerator to the combustion chamber, means for supplying fuel to the combustion chamber, means for conducting motive fluid from the combustion chamber to said turbine means for expansion therein, and thermostatically controlled means for maintaining the temperature of said motive fluid at the place or places of initial expansion in the system within a range the lower limit of which is approximately 800° C. absolute and the upper limit of which is of the order of 1000° C. absolute.

16. A gas turbine system of the continuous combustion type comprising turbine means, compressor means and power output means driven by said turbine means, a cooler, a first regenerator and a second regenerator, conduits for conducting motive fluid exhausted from said turbine means through said first and said second regenerators in the order named, means for conducting compressed air from said compressor means to said cooler, means for supplying water to said second regenerator and for conducting preheated water from said second regenerator to said cooler for cooling the compressed air by vaporizing the water in contact with the air, means for conducting the compressed air to said first regenerator, means providing a combustion chamber, means for conducting the compressed air from said first regenerator to said combustion chamber, means for supplying fuel to the combustion chamber, and means for conducting motive fluid from the combustion chamber to said turbine means.

17. In a gas turbine system of the continuous combustion type in which air is compressed and utilized for the combustion of fuel to provide a motive fluid for operating turbine means comprising a part of the system, the improved method of operation which comprises compressing the air, cooling the air after final compression with water out of contact with the air, heating the compressed and cooled air with motive fluid which has been expanded in the system, thereafter heating the compressed air by internal combustion of fuel therewith to produce motive fluid, expanding said motive fluid in said turbine means, and expanding the steam of the cooling water in a steam turbine.

18. In a gas turbine system of the continuous combustion type in which air is compressed and utilized for the combustion of fuel to provide a motive fluid for operating turbine means comprising a part of the system, the improved method of operation which comprises compressing the air, cooling the air after final compression with water out of contact with the air, limiting the amount of cooling water to insure vaporization of all of the cooling water, heating the compressed and cooled air with motive fluid which has been expanded in the system, thereafter heating the compressed air by internal combustion of fuel therewith to produce motive fluid, expanding said motive fluid in said turbine means, and expanding the steam of the cooling water in a steam turbine.

19. In a gas turbine system of the continuous combustion type in which air is compressed and utilized for the combustion of fuel to provide a motive fluid for operating turbine means comprising a part of the system, the improved method of operation which comprises compressing the air, cooling the air after final compression with water out of contact with the air, heating the compressed and cooled air with motive fluid which has been expanded in the system, thereafter heating the compressed air by internal combustion of fuel therewith to produce motive fluid, expanding said motive fluid in said turbine means, expanding the steam of the cooling water in a condensing steam turbine, and utilizing again the water of condensation of said steam turbine for cooling compressed air.

20. In a gas turbine system of the continuous combustion type in which air is compressed and utilized for the combustion of fuel to provide a motive fluid for operating turbine means comprising a part of the system, the improved method of operation which comprises compressing the air, cooling the air during compression with water out of contact with the air, cooling the finally compressed air by injection of the cooling water thereinto, heating the compressed and cooled air with motive fluid which has been expanded in the system, and thereafter heating the compressed air by internal combustion of fuel therewith to produce motive fluid and expanding said motive fluid in said turbine means.

21. A gas turbine system of the continuous combustion type comprising turbine means, compressor means and power output means driven by said turbine means, said compressor means compressing air to form a constituent of motive fluid to be expanded in said turbine means, a cooler adapted to cool the air during compression with water out of contact with the air, a second cooler, means for conducting air compressed in said compressor means to said second cooler, means for injecting said water into said air in said second cooler whereby to cool the compressed air by vaporizing said water, a regenerator, means for conducting the compressed air from the cooler to the regenerator, means for conducting expanded motive fluid from said turbine means to said regenerator, means providing a combustion chamber, means for conducting the compressed air from the regenerator to the combustion chamber, and means for conducting motive fluid from the combustion chamber to said turbine means for expansion therein.

22. A gas turbine system of the continuous combustion type comprising gas turbine means, steam turbine means, compressor means and power output means driven by said turbine means, said compressor means compressing air to form a constituent of motive fluid to be expanded in said gas turbine means, a cooler, means for conducting air compressed in said compressor means to said cooler, means for conducting water into said cooler whereby to cool the compressed air with said water out of contact with the air, a regenerator, means for conducting the compressed air from the cooler to the regenerator, means for conducting expanded motive fluid from said gas turbine means to said regenerator, means providing a combustion chamber, means for conducting the compressed air from the regenerator to the combustion chamber, means for supplying fuel to the combustion chamber, means for conducting motive fluid from the combustion chamber to said gas turbine means for expansion therein, and means for conducting the steam of the cooling water from said cooler to said steam turbine means for expansion therein.

23. A gas turbine system of the continuous combustion type comprising gas turbine means, steam turbine means, compressor means and power output means driven by said turbine means, a cooler, a first regenerator and a second regenerator, conduits for conducting motive fluid exhausted from said gas turbine means through said first and said second regenerators in the order named, means for conducting compressed air from said compressor means to said cooler, means for supplying water to said second regenerator and for conducting preheated water from said second regenerator to said cooler for cooling the compressed air by vaporizing the water out of contact with the air, means for conducting the compressed air to said first regenerator, means providing a combustion chamber, means for conducting the compressed air from said first regenerator to said combustion chamber, means for supplying fuel to the combustion chamber, means for conducting motive fluid from the combustion chamber to said gas turbine means, means for conducting the steam of the cooling water from said cooler to said steam turbine means for expansion therein, a condenser, means for conducting the steam exhausted from said steam turbine means to said condenser for condensing therein, and means for conducting the water of condensation from said condenser to said second regenerator.

24. In a gas turbine of the continuous combustion type, turbine means comprising a high pressure turbine and a low pressure turbine serially connected with respect to flow of motive fluid therethrough, compressor means comprising a high pressure compressor and a low pressure compressor driven by said turbine means, power output means driven by one of said turbines, a cooler, a regenerator, a combustion chamber, conduit means connecting the outlet of the low pressure compressor with the inlet of the high pressure compressor, means for cooling the air passing through said conduit means, conduit means connecting the outlet of the high pressure compressor with said cooler, conduit means connecting said cooler with said regenerator, conduit means connecting said regenerator with said combustion chamber, conduit means connecting said regenerator with the inlet of the high pressure turbine, conduit means connecting the outlet of the low pressure turbine with said regenerator, means for injecting a controlled quantity of water into said cooler, and means for injecting a controlled quantity of fuel into said combustion chamber.

ALF LYSHOLM.